United States Patent [19]

Mounce

[11] 3,857,353

[45] Dec. 31, 1974

[54] SAILING VESSEL SELF-STEERING SYSTEM

[76] Inventor: George R. Mounce, 18 Bridle Path, Willowdale, Ontario M2L IC8, Canada

[22] Filed: Feb. 5, 1974

[21] Appl. No.: 439,738

[52] U.S. Cl. ............. 114/144 C, 318/588, 318/640, 114/144 R
[51] Int. Cl. ....................... B63n 25/00, B63n 25/04
[58] Field of Search .................. 114/144 RE, 144 C; 318/588, 640; 200/81.9 R, 153 LB; 340/240

[56] References Cited
UNITED STATES PATENTS

| 987,698 | 3/1911 | Cheney | 200/153 LB |
|---|---|---|---|
| 3,135,903 | 6/1964 | Tomek | 318/640 |
| 3,465,221 | 9/1969 | Arce et al. | 318/640 |
| 3,696,282 | 10/1972 | Hirokawa | 114/144 RE |
| 3,727,457 | 4/1973 | Gregory | 340/240 |
| 3,765,361 | 10/1973 | Saye | 114/144 C |

Primary Examiner—George E. A. Halvosa
Assistant Examiner—Sherman D. Basinger
Attorney, Agent, or Firm—Dowell & Dowell

[57] ABSTRACT

An automatic steering system for marine vessels in which the main steering function is provided by a wind vane disposed at an adjusted angle with respect to the vessel's rudder which it controls by maintaining a balance between the wind pressure on the vane and the force on the rudder exerted by the water through which the vessel is moving, and in which a corrective function is provided by electric means controlled by a preset compass heading which is sensed to deliver corrections when the vessel deviates from that heading, such corrections changing said adjusted angle to restore equilibrium at the proper heading; the electronic circuitry including a feature whereby the vessel not only has its heading corrected after a deviation but is also brought back on its original course, and the steering system including alarm limits for alerting the crew to deviations exceeding a preset working range of the system.

10 Claims, 8 Drawing Figures

3,857,353

SAILING VESSEL SELF-STEERING SYSTEM

FIELD OF INVENTION

This invention relates to automatic steering systems for marine vessels, and more particularly relates to steering systems for sailing vessels in which the main steering function is performed by an adjustable wind vane mechanism, and in which a corrective function is performed by an electrical system controlled by a preset compass sensor which adjusts said wind vane mechanism in response to vessel heading deviations.

BACKGROUND AND PRIOR ART

Mechanical wind vane self-steering mechanisms per se are well known in the art, as typified by U.S. Pat. Nos. 1,681,415; 2,112,171; 3,180,298 and 3,678,878. These systems have the great advantage of almost instant response to a change in wind velocity or direction. The smaller the sailing vessel, the more important is this quickness. In systems of this type, the mechanism coupling the wind vane to the rudder is manually adjusted to provide an angle between vertical planes including the vane and the rudder whose magnitude is selected to maintain the vessel on a certain heading for the existing wind velocity and direction, but every change in the wind produces a different balance point between the wind force on the vane and the force of the water on the rudder, and the change is of course accompanied by an upset in the adjusted equilibrium and a resulting change in heading. If the change in the wind is only temporary the vessel will resume its heading afterwards, but in any event, the heading is no more constant than the wind.

There are many electrical steering systems for vessels, as typified for example by U.S. Pat. Nos. 2,866,930; 3,696,282; 3,691,978; 3,685,478 and 3,771,483. Some of these patents include servo systems in which wind direction or velocity is included as a factor which is entered as one parameter into complex electric control circuitry, but in general the ship's heading is controlled primarily by a preset compass sensor coupling an error signal into the control circuitry as the principal steering function criterion. This type of steering is relatively slow, but on large vessels slowness is not a disadvantage, and may even be desirable since it avoids useless rapid changes in rudder position to which a large vessel can not respond. The above mentioned prior art also includes integrating means in the control circuitry which performs differently than the integrator included in the present disclosure.

THE INVENTION

This invention combines the two types of prior art systems mentioned above in a novel manner to provide an improved self-steering system especially well adapted for use on smaller sailing vessels where quickness of response is very important, but wherein it is also important to have the vessel maintain a desired heading even though the wind changes direction and/or velocity, especially where such changes are not mere temporary shifts.

It is the principal object of this invention to provide a self-steering system in which the vessel's rudder is coupled with a wind vane for immediate control through a mechanism which adjusts the angle between the rudder and the vane so that the vessel will sail a heading which establishes an equilibrium at which the wind force on the vane balances the force on the rudder of the water through which the vessel is moving, and in which electrical circuitry controlled by sensing deviations from a preset compass heading is operative to adjust said mechanism to provide an angle between the rudder and the vane which will tend to correct the average of said heading deviations toward zero.

It is another major object of the invention to provide a system in which the steering is accomplished primarily by a mechanical wind vane mechanism because this type of steering preserves optimum sailing efficiency for a particular trim of the sails. The wind is always undergoing changes, and where these changes are within the control capability of the steering system, a properly designed and adjusted wind vane steering mechanism will just compensate for them without undesirable oversteering which tends to slow the vessel or understeering which allows the heading of the vessel to deviate so that additional steering is required to resume an average heading. This compensation aboard a small vessel can be accurate only if it is immediate.

Another important object of the invention is to provide electrical circuitry controlled by error deviations from a preset compass heading which not only maintains an average heading by proportionally readjusting the differential angle between the wind vane and the rudder to reduce deviation of the vessel from the preset heading, but also operates in response to an actual deviation to steer the vessel back through the preset heading to the other side thereof and then to slowly ease the corrective readjustment of the mechanism so that the vessel resumes not only the correct heading but also virtually the original course line. This feature can be very important in narrow channels and when racing under circumstances where being on the proper course line is of major importance.

Still another object of the invention is to provide combined wind vane steering and electrical course control wherein manual means is included in the mechanism to facilitate intitial setting of the angle between the wind vane and the rudder, which manual means gives the helmsman the "feel" of the vessels performance before the automatic course adjusting circuitry is permitted to take over full control, as distinguished from some prior art systems in which "manual" control is achieved by controlling a motor which actually does the steering.

A further object of the invention is to provide electrical control circuitry in which the corrective means of the electrical circuitry is required to make only slow-rate adjustments of the differential angle between the vane and the rudder so that a large gear reduction can be used, thereby requiring very little battery power to drive the corrective means.

Another object is to provide limit-actuated alarms to alert the crew when an undesirable situation is threatening. For example, if the wind should shift and come from a direction so far forward of the vessel that the vessel is severely "pinched" and can not successfully sail thereinto because the angle between the wind and the course is too small, the vessel will lose way and may end up "in irons". A pinch alarm is provided which warns of such an event. Conversely, a shift of the wind which increases its angle to the vessel's course may become dangerous if the sails are not again trimmed. A trim alarm is provided to warn of such a shift. the alarms are intended to alert the crew and are operated in response to various positions of the wind vane relative to the vessel's head.

Other objects and advantages of the invention will become apparent during the following discussion of the drawings, wherein:

THE DRAWINGS

FIG. 1 is a diagrammatic view of a steering system according to the present invention;

FIGS. 2 through 5 respectively illustrate a compass sensor system and compass error circuit;

Figure 1:
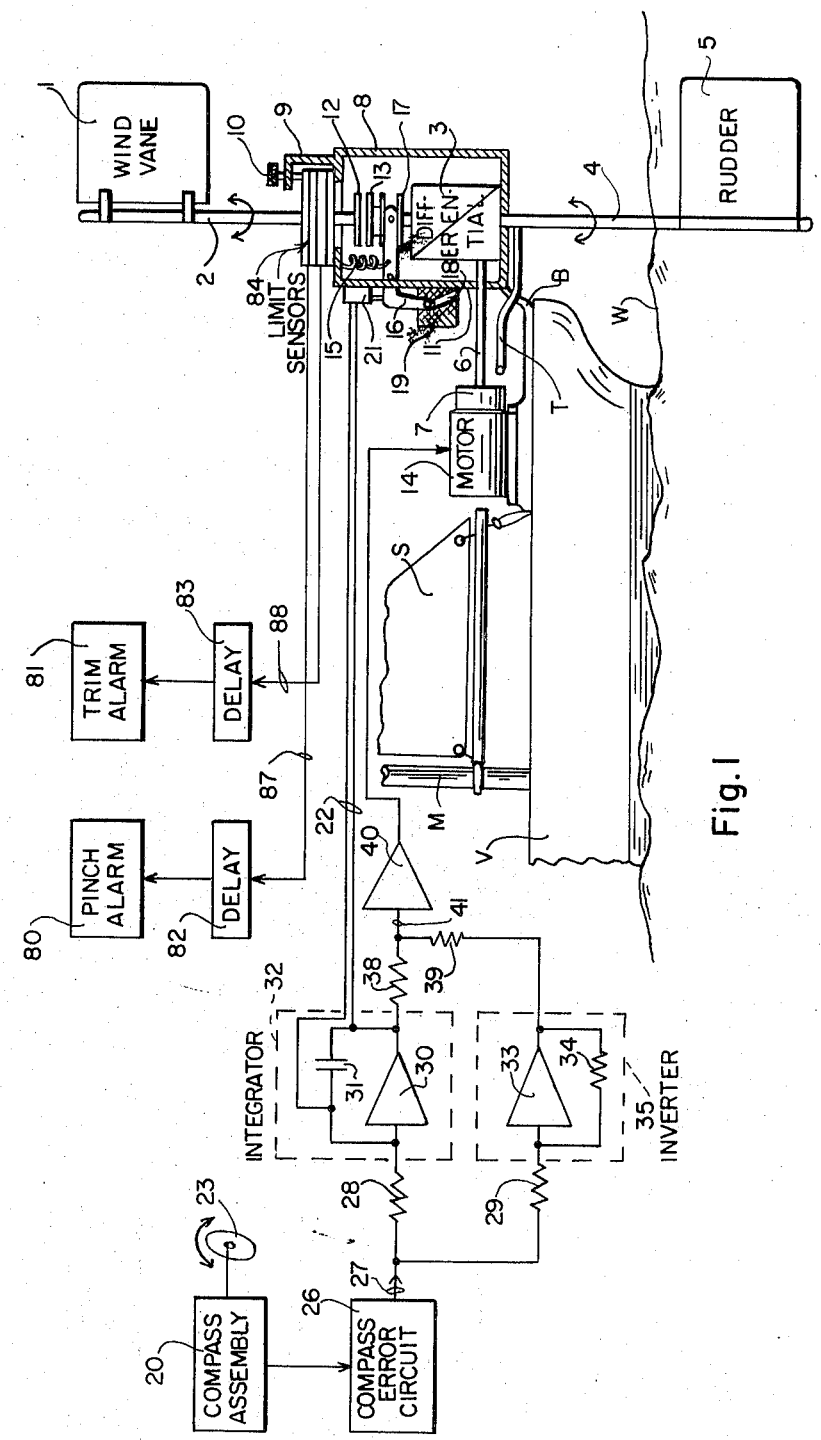

Referring now to FIG. 1 of the drawings, this illustration shows a sailing vessel V having a mast M carrying sails S which have been trimmed for a particular heading and for a particular wind direction. A bracket B is mounted at the stern of the vessel V and supports a self-steering assembly of the wind vane type. This assembly includes a wind vane 1 fixed to a shaft 2 which extends upwardly from a differential gearing assembly 3 which is mounted on the bracket B for support. A rudder shaft 4 extends downwardly from the differential assembly 3 and carries a rudder 5 at its lower end which is immersed beneath the surface of the water W. The differential assembly 3 includes a third shaft 6 extending into a gear reducer unit 7 and positioned thereby. The differential 3, and other mechanical parts, are supported in a frame 8 which is part of the bracket B. The position of the shaft 6 is controlled by the motor 14, and rotation of the shaft 6 controls the relative angle between the vane and the rudder for the equilibrium condition to which the system is initially adjusted when the vessel is on course. A clutch including the plates 12 and 13 is interposed in the wind vane shaft 2 and is normally maintained engaged by a spring 15, but can be disengaged by rocking a lever 16 which is pivotally carried by the front plate 11 of the frame 8. The lever can control the collar 17 to separate the clutch plate 13 from the plate 12 and thereby disengage the wind vane 1 from the differential 3. The lower left end of the level 16 has a pin in it which rides in a slot 18 in a knob 19 rotatably carried on the front member 11 of the frame. Rotation of the knob 19 rocks the lever 16 selectively to engage and disengage the clutch plates 12 and 13. The vessel is also equipped with manual steering means, illustrated in FIG. 1 as the tiller T. When it is desired to steer the vessel manually, the knob 19 is turned to the position illustrated wherein the clutch plates 12 and 13 are disengaged and the vessel is then steered by the tiller, leaving the wind vane 1 free to assume any position to which the wind turns it. When the knob 19 is rotated a half-turn to reengage the clutch plates 12 and 13 while the vessel is on the desired heading, the system will be well enough balanced so that the automatic electric circuitry will be able to take over control and make a final adjustment to achieve the correct course by driving the electric motor 14 in a direction to accomplish optimum positioning of the shaft 6 for a particular relative wind direction, whereupon the vessel will be on course and the force of the wind on the vane 1 will balance the force on the rudder of the water through which it is passing. The reduction provided by the gear reducer 7 is sufficient to prevent the motor 14 from being turned by the shaft 6 when the motor is de-energized, and a relatively large gear reduction permits the use of a small motor which is economical to operate from the point of view of drain on the vessel's source of electric power.

Referring now to the electric circuitry which automatically adjusts the position of the shaft 6 by driving the motor 14 in an appropriate direction, this circuitry performs the basic purpose of reading the vessel's compass 20 using means illustrated in FIGS. 2 through 5 as will be presently described in greater detail. This means is shown as boxes 20 and 26 in FIG. 1, the box 26 being referred to as an ERROR circuit and serving to deliver a control signal on wire 27, which is zero if the heading of the vessel is correct, increases in one polarity direction when the vessel heading is to starboard of a preselected compass value, and increases in the other polarity direction when the vessel heading is to port of said value. The output of the compass error circuit 26 on wire 27 is fed through two resistors 28 and 29 to the inverting inputs to two differential amplifiers 30 and 33, the amplifier 30 having a capacitor 31 connected across it to form therewith an integrator circuit 32, and the amplifier 33 having a feedback resistor 34 connected across it and forming therewith an inverter circuit 35. The integrator 32 and the inverter 35 are coupled respectively through resistors 38 and 39 to a servo amplifier 40 which delivers power to drive the reversible motor 14 for adjusting the position of the shaft 6 as discussed above, the polarity and magnitude of the composite input signal on wire 41 determining the direction and rate of rotation of the motor 14 and varying proportionately with the magnitude and direction of the sensed compass error.

Figures 3, 4:
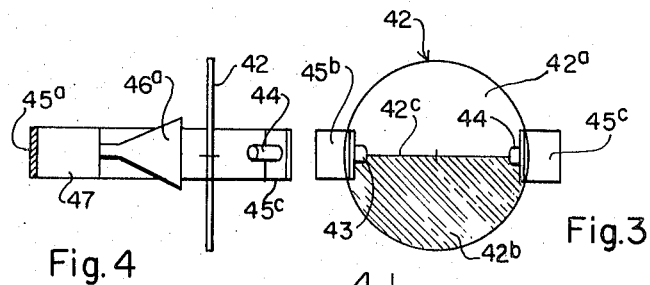
Figure 2:
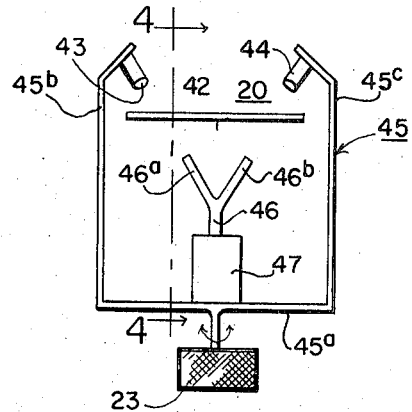

FIGS. 2, 3, and 4 are related views showing a practical embodiment of a compass reading system in which a compass card 42 is suspended on suitable pivot means (not shown) so that it remains pointing in the same direction with respect to the Earth's magnetic field. The card 42 is divided into a transparent half 42a and an opaque half 42b. Two alternately pulsed light sources 43 and 44 are supported on a frame 45 which includes a base 45a and two upstanding legs 45b and 45c which respectively support the light sources 43 and 44 above the compass card 42. Each light source when illuminated, shines on the card 42 and when its transparent half 42a is presented, the source shines through the card onto a plastic light collection member 46 below the card. The plastic member 46 preferably is made up of shaped bundles of light conducting fibers, although it can be a molded plastic member with its outer surfaces mirrored to prevent the escape of light. The member 46 is divided into two light channels 46a and 46b, each directed at one of the light sources 43 and 44. The light channels 46 are preferably fanned out as can be seen in FIG. 4 so as to collect an amount of light which varies proportionately with displacement over a considerable azimuth angular arc, whereby when the division line 42c between the transparent and opaque portions of the card 42 is over any portion of a light channel, the total light collected in that channel will be a function of the rotational position of the card. The channels 46a and 46b merge and shine on a common photoelectric cell 47.

Figure 5:
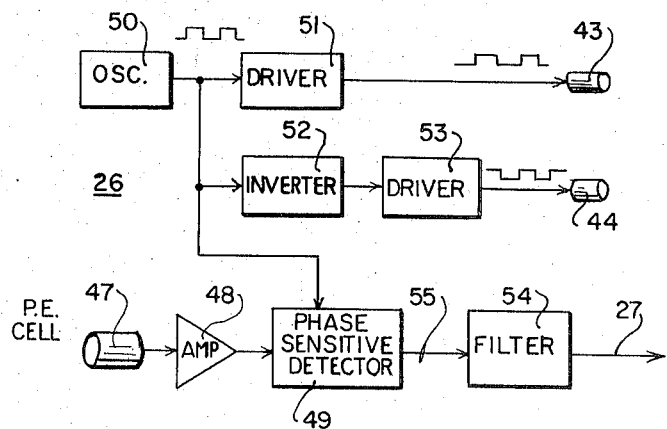

Referring now to FIG. 5, the P.E. cell 47 is coupled to an amplifier 48 which raises the level of its output and delivers it to a detector 49. The two light sources 43 and 44 are driven alternately by drivers 51 and 53 which are in turn alternately turned on by output from an oscillator 50, the driver 53 being coupled through an inverter 52 to the oscillator 50, which in the present embodiment runs continuously at a nominal 500 Hz. The light sources advantageously comprise light emitting diodes which can be efficiently commutated by the 500 Hz oscillation.

The detector 49 is also synchronously switched by the oscillator 50 so that it provides output on one half cycle of the oscillation which output represents the amount of light collected from the source 43, for instance, and so that the detector 49 provides oppositely poled output on the other half cycle of the oscillation which output represents the amount of light collected from the other source 44. Both outputs appear on the same wire 55 alternately, and they are then averaged in a low pass filter 54 to provide a composite compass error signal appearing in FIG. 1 and in FIG. 5 on wire 27. Of course, the light collected by the P.E. cell 47 from the alternately illuminated sources 43 and 44 is equal when the line 42c lies below the centers of the two sources, and is modulated to favor one or the other of the sources when the vessel's heading deviates from the preset heading.

The remaining mechanical structure of the compass is not shown, but may take one of many prior-art forms, the knob 23 in FIGS. 1 and 2 rotates the frame 45 with respect to the vessel's lubber line for the purpose of presetting any desired heading.

Figure 6:
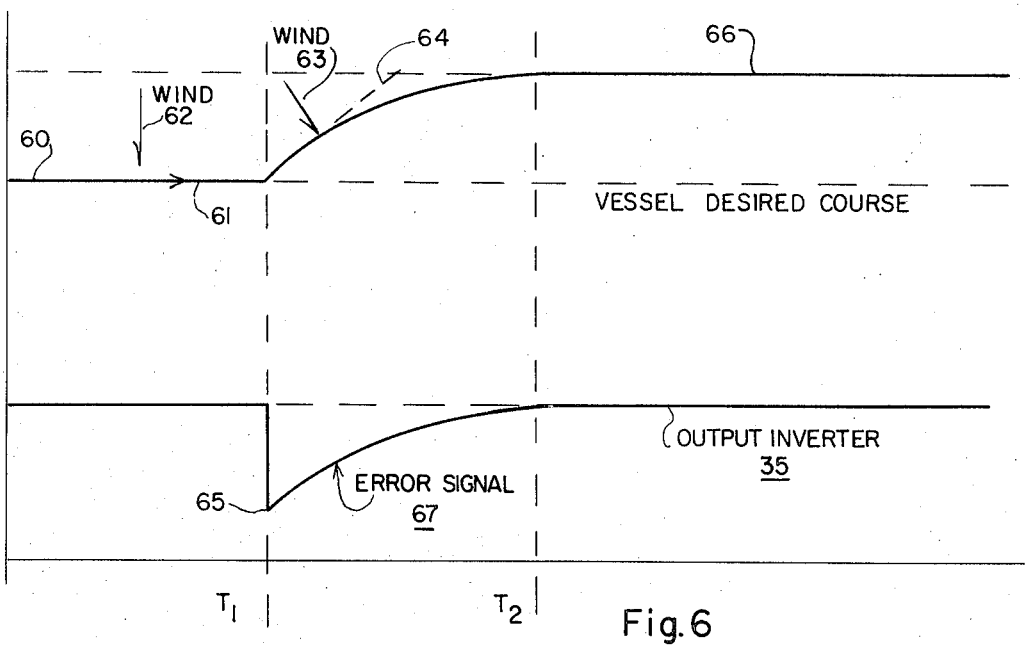
FIG. 6 is a graphical representation of the performance of the steering system if the integrator were omitted from the electrical circuitry.
Figure 7:
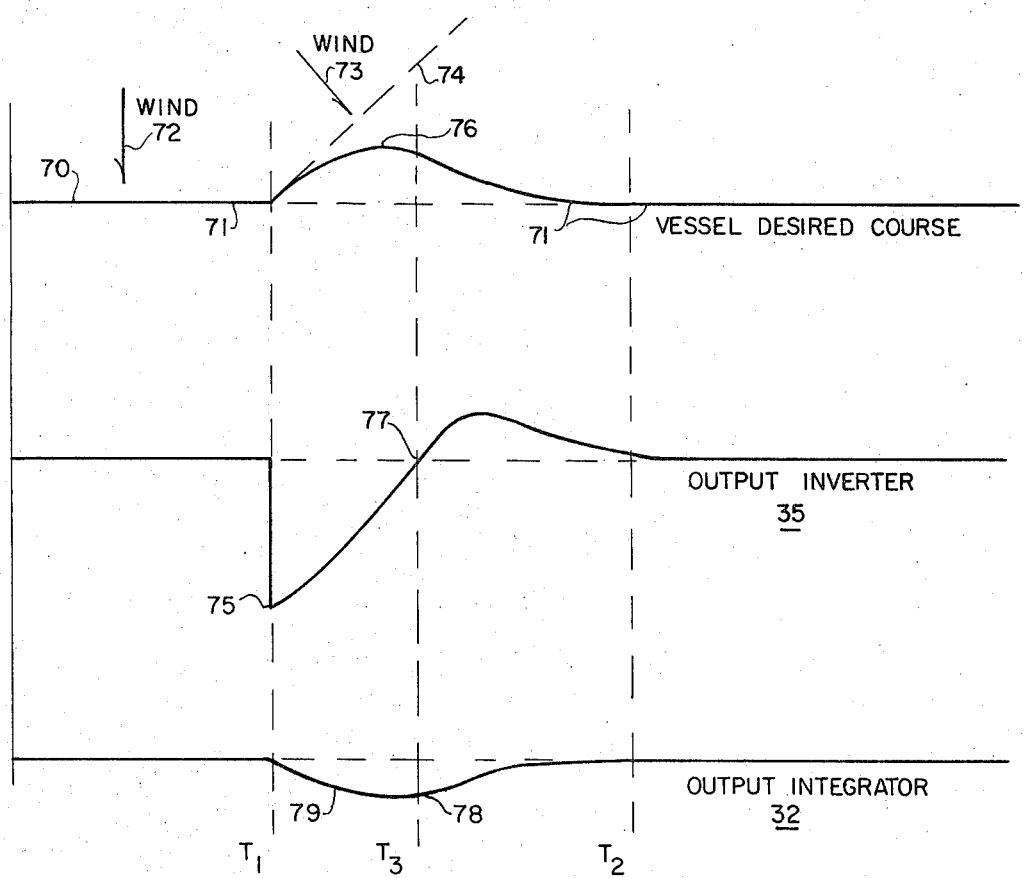
FIG. 7 is a graphical representation of the performance of the steering system of the present invention including the integrator in the electrical circuitry.

FIG. 6 graphically illustrates the performance of the system if the integrator 32 were omitted and only the inverter remained to join the wire 27 to the servo amplifier 40, whereas, FIG. 7 illustrates the performance of the system with the integrator 32 and the inverter 35 included as shown in FIG. 1. The inverter 35 is only required to make the polarity of the two signals applied to the servo amplifier 40 the same, in view of the fact that the output polarity of the integrator 32 is inverted with respect to its input polarity. If no integrator 32 is used in the circuit, then the circuit polarities can be selected so that no inverter will be necessary. The use of an integrator is optional.

Referring now to FIG. 6, this illustration assumes that the integrator 32 has been omitted. In FIG. 6 the upper curve 60 includes a line 61 illustrating a desired sailing course and an "on-course" heading for the vessel V for a prevailing wind direction 62. At time T1 the wind backs to a new direction 63 and the mechanical wind vane mechanism promptly turns the rudder to bring the vessel onto a new heading 64, at which the new angle of the wind 63 to the vessel's new heading 64 is the same as the original angle of the wind 62 was to the original heading 61. In the absence of an integrator 32, the output from the compass error circuit 26 on the wire 27 drives the inverter output strongly negative as shown at 65. Now, if the change in wind direction 63 persists and the wind does not veer back to its original direction 62, then the motor 14 will be driven by the servo amplifier to change the position of the shaft 6 and thereby readjust the differential assembly 3 so as to bring about a new equilibrium between the vane 1 and the rudder 5 at which the vessel is back again on its desired heading, but on a somewhat displaced course 66 which is parallel to the original course 61. As the vessel gradually assumes the correct heading on the parallel course 66, the error signal 67 on the wire 27 gradually decreases until it becomes zero at time T2, whereupon a new equilibrium angle is established between the vane 1 and the rudder 5, whereat the pressure of the water on the rudder 5 moving through it just equals the pressure of the wind from the new direction 63 upon the wind vane 1 and is balanced by it. Thus, if the integrator 32 is not used in the circuitry after a wind shift, which persists and is not merely temporary, the vessel is automatically returned to the desired heading, but it is not on the original course 61. Instead, it is now sailing a parallel course 66, and the mechanism will not return it to the original course unless the wind should make an equal and opposite direction shift back to its original direction 62.

FIG. 7 graphically illustrates the performance of the system when the integrator 32 and the inverter 35 are both coupled to the input 41 of the servo amplifier as shown in FIG. 1. In FIG. 7, the uppermost curve 70 includes a line 71 illustrating a desired sailing course and an "on-course" heading for the vessel V for a prevailing wind direction 72. At the time T1 the wind backs to a new direction 73, and the mechanical wind vane mechanism immediately turns the rudder to bring the vessel up onto a new heading 74, at which the angle of the wind 73 to the vessel's new heading is the same as the angle of the wind 72 was to the original heading 71. At the time T1 the output from the compass error circuit 26 indicates a sudden large error in heading with respect to the preset compass heading selected by the knob 23, and therefore the output of the inverter 35 illustrated in the middle curve of FIG. 7 goes strongly negative, as shown at 75. Moreover, the integrator 32 begins integrating the output on the wire 27 at time T1 so that its output starts increasing in the negative direction, as shown at 79. As a result the motor 14 is driven rapidly in a direction to bring the vessel V back on course again, which it accomplishes at the instant T3 as shown at 76 in the top curve 70. At this moment the center curve has passed through zero error voltage again as shown at 77 because the compass error is zero for the moment, but the integrator output at 78 is still strongly negative. Therefore, the motor 14 continues to be driven further in the same direction and as a result the vessel's heading as shown at 76 in the curve 70 begins turning back toward the original course line 71. Accordingly, the inverter output goes positive after point 77 because the polarity of the compass error circuit output on wire 27 has reversed. The vessel V continues approaching the original course line 71, but as the error voltage rises positively on the inverter curve beyond the point 77, it begins counteracting the negative integrator voltage appearing beyond the point 78 at the input 41 to the servo amplifier 40, and in addition the integrator output voltage of the bottom curve of FIG. 7 is being reduced because of the reversal in polarity of the input voltage being applied on wire 27. Thus, the vessel's head gradually returns to the desired heading, and if the parameters of the integrator 32, inverter 35 and error circuit 26 are properly tuned and matched to the mechanical response of the vessel and the vane steering mechanism, the vessel will be back on its original course at time T2.

Obviously when the vessel is being steered manually using the tiller T, and the clutch plates 13 and 12 are disengaged, it is undesirable to allow the capacitor 31 to build up an error signal voltage. Therefore, whenever the knob 19 is rotated to rock the lever 16 in a direction to retract the clutch plate 13 from the plate 12, the lever 16 closes a switch 21 which is connected by wires 22 across the capacitor 31, whereby as long as the clutch plates are disengaged, the integrator capacitor 31 is shortcircuited.

The use of the integrator circuit 32 is an option based on several factors. Although its inclusion would probably never be a disadvantage, it might well be an important improvement for sailing vessels which sail narrow channels, or which are used for racing where the maintaining of a course is so important that even a modest lateral course displacement could lose the vessel's racing advantage.

It is well known in the prior art that vane steering mechanisms have limits as to their capability to absorb large wind shifts and still preserve safe and efficient control of the vessel, and therefore alarm limits must be included in a useful system, as has been generally recognized in other known systems such as in U.S. Pat. No. 3,696,282, supra. FIG. 1 of the present disclosure shows an improved alarm system designed to provide warnings in the form of a "pinch" alarm 80 responsive to a wind direction which is too close to the vessel's present heading, and a "trim" alarms 81 responsive to a wind direction which shifts too far abaft the present heading. These alarms 80 and 81 are controlled through delay circuits 82 and 83 by switches located in an alarm switch assembly 84 surrounding the wind vane shaft 2, these switches being seen best in FIG. 8. The switch assembly 84 includes two cams 85 and 86 fixed on the shaft 2 so that they follow the direction of the wind vane 1 which always occupies an angular position determined by the wind pressure on the vane 1 and the water pressure on the rudder 5, assuming that the clutch plates 12 and 13 are engaged. The upper cam 85 extends through an angle of about 40° while the lower cam 86 extends through an angle of about 90°. Four switch supporting rings 90, 91, 92 and 93 surround the cams and lie stacked upon each other as shown in FIG. 1 at reference character 84, and these rings are clamped in place by a clamp screw device 10 so that the rings lie concentrically about the shaft 2 with the upper two rings opposite the cam 85 and the lower two rings opposite the cam 86. The rings 90 and 91 contain switches 94 and 95, respectively, and these two switches are normally open, and are connected in parallel with each other and coupled to energize the wire 87 when either switch 94 or 95, or both, is closed by the cams 85 contacting a switch arm 94a or 95a. Likewise, the rings 92 and 93 carry switches 96 and 97, respectively, and these switches are connected in parallel with each other and coupled to energize the wire 88 when either switch 96 or 97, or both, is closed by the cam 86 contacting a switch arm 96a or 97a. The rings 90, 91, 92 and 93 are provided with pointers opposite the switch arms so that their positions can be visually determined externally of the switch assembly 84. Thus, the four switches can be positioned independently to provide an alarmless sector of operation for port and starboard tacks of the vessel, and these sectors can be moved about at will and/or made to cover greater or lesser azimuth angles. In order to prevent premature alarm response, for instance, to a brief wind shift, the delay units 82 and 83 are included so that a shift must have significant duration before any alarm is sounded since brief shifts of the wind into alarm protected sectors will cause only slight loss of way.

Figure 8:
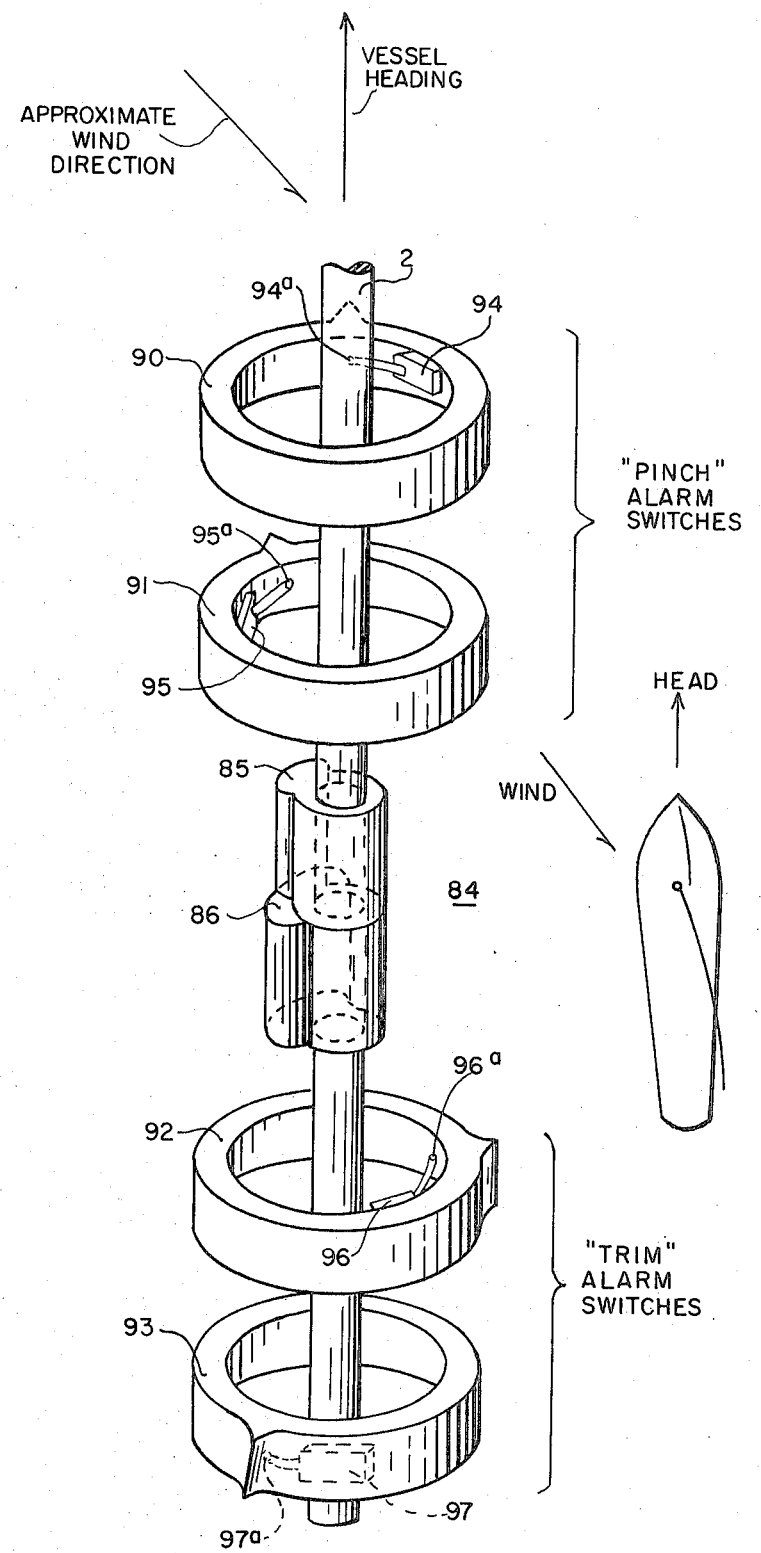
FIG. 8 is an expanded perspective view of a limit switch assembly for an alarm system.

Referring further to FIG. 8, if the lobe of the cam 85 occupies 40°, and if the two upper rings 90 and 91 were rotated to place their pointers forward, in the position occupied only by the ring 90 in FIG. 8, then the "pinch" alarm zone would extend from 40° on the starboard bow to 40° on the port bow. However, since the ring 91 as actually illustrated is displaced somewhat to port, say 10°, the pinch alarm zone has been extended on the port bow to 50°. Most sailing vessels can not sail closer than 40°–50° into the wind, and therefore 50° off the vessel's lubber line is a reasonable setting for both sides. Since the cam 85 is assumed to have a 40° lobe, the pointers on the rings 90 and 91 should not be set more than 40° apart since greater separation would leave an unguarded zone at the vessel's head. 40° separation of the pointers would provide an alarm zone of 120° width total, or 60° each side of forward.

Likewise, assuming that the trim alarm cam 86 has a 90° lobe, if both of the rings 92 and 93 were set with their pointers dead astern, i.e. pointing at the observer in FIG. 8, then the alarm zone for the trim would extend from the starboard beam through the stern to the port beam, or 180° total. Since the pointers on the rings 92 and 93 can be separated by 90° maximum, they could each be moved to 45° on the starboard and port quarters, and in this event the "trim" alarm protected sector could be made to extend from broad on the starboard bow to broad on the port bow, i.e. 45° forward of the beam on each side of the vessel, which would overlap the "pinch" alarm zone somewhat. Of course, the angles of the lobes on both cams 85 and 86 can be selected to suit any desired type of vessel.

This invention is not to be limited to the exact forms shown in the drawings, for obviously changes can be made within the scope of the following claims.

The embodiments of the invention in which exclusive property or privilege is claimed are defined as follows:

1. A self-steering system for a sailing vessel having a rudder and having a compass, comprising:
   a. a wind vane mounted on the vessel to sense and follow the direction of the wind;
   b. a differential mechanism coupling the wind vane directly with the rudder so that the wind vane and the rudder move so as to balance turning forces acting on the vane and the rudder, said differential mechanism further including adjustment means for selectively adjusting the angular relationship between the rudder and the vane;
   c. compass sensor means settable to sense deviations of the vessel's heading from a preset compass heading and operative to deliver error signals representative of the sense and magnitude of such deviations; and
   d. servo circuitry coupled to said sensor means and to said adjustment means and responsive to said error signals to adjust said mechanism to alter said angular relationship such that the pressure of the wind on the vane will move the rudder to reduce the magnitude of the error signals toward zero.

2. A self-steering system as set forth in claim 1, wherein said mechanism comprises a differential assembly supported on the vessel and having oppositely extending first and second shafts respectively carrying the wind vane and the rudder, and having a third shaft coupled to be positioned by a motor comprising said adjustment means for altering the angular relationship between the first and second shafts.

3. A self-steering system as set forth in claim 2, wherein said sailing vessel has manual steering means coupled to the rudder, and wherein a clutch is interposed in said first shaft for selectively disconnecting and connecting the wind vane with the differential mechanism, and switch means operative with the clutch and connected to said circuitry to maintain said error signal at zero level whenever the clutch is disconnected.

4. A self-steering system as set forth in claim 1, wherein said servo circuitry comprises motor means coupled to said differential mechanism for adjusting said angular relationship and wherein the polarity of said error signals indicates the direction of deviation of the vessel's heading from an initial course line along said preset compass heading, and said servo circuitry further including a linear amplifier path and an integrating amplifier path both having inputs coupled to receive said error signals and having outputs coupled in parallel to control said motor means, said linear path responding to initial error signals to initiate adjustments in said angular relationship for reducing the deviation of the vessel's heading and said integrating path integrating said error signals and providing an output based on the integrated level to continue said adjustments in the same direction to cause the heading of the vessel to pass through said preset compass heading to the other side thereof, thereby reversing the polarity of the error signal to said linear path and gradually returning the vessel toward said initial course.

5. A self-steering system as set forth in claim 1, including alarm means coupled to respond to the position of the wind vane relative to the vessel's heading and operative to initiate an alarm when the vane occupies an angular position outside of preset limits.

6. A self-steering system as set forth in claim 1, wherein said mechanism includes oppositely extending first and second differentially related shafts respectively carrying the wind vane and the rudder, an alarm assembly including cam means rotatable with the first shaft whose angular position represents the position of the wind vane and including switch means adjustable about the first shaft for positioning with respect to the vessel's head, alarm means coupled to be actuated when the cam means closes the switch means, and delay means interposed between the switch means and the alarm means.

7. A self-steering system as set forth in claim 6, wherein said switch means comprise multiple switches coupled to said alarm means and each mounted on a separate support ring which is rotatably positionable with respect to the vessel's head, the rings being stacked about the first shaft, and clamp means for maintaining the rings in adjusted positions.

8. A self-steering system as set forth in claim 7, including four rings supporting four switches including a first pair having port and starboard switches facing forward of the vessel's beam to sense wind directions too close to the vessel's heading and including a second pair having port and starboard switches facing aft of the vessel's beam to sense wind directions aft of directions for which the vessel's sails are trimmed, the alarm means including a "pinch" alarm connected to said first pair of switches and a "trim" alarm connected to said second pair of switches.

9. A self-steering system as set forth in claim 1, wherein said sailing vessel compass has a compass card with opposed transparent and opaque sectors with a line of demarcation therebetween, two pulsed light sources on one side of the card and positioned to pass light through the transparent sector, means for collecting light on the other side of the card, frame menas rotatable about the center of the card for selecting a desired compass heading and the frame means supporting the sources in annularly spaced relationship with respect to the transparent sector such that when the vessel is on the desired heading the light from both sources will fall equally on opposite sides of said line of demarcation, and circuit means operative to alternately pulse said sources during equal intervals and operative to detect the level of collected light from each source and opposingly combine the detected levels to provide said error signal.

10. A self-steering system as set forth in claim 9, wherein said light collecting means is also supported on the frame and has two light channels respectively opposite said light sources, the annular extents of said channels being equal and the channels being so located with respect to the card that when the line of demarcation is not centered through both channels, the relative variation of light collected in the channels is modulated in proportion to the deviation from centered position.

* * * * *